United States Patent [19]

Hui

[11] Patent Number: 5,737,094
[45] Date of Patent: Apr. 7, 1998

[54] SECURE FAX ADAPTER METHOD AND APPARATUS

[75] Inventor: James S. Hui, Mountain View, Calif.

[73] Assignees: Ricoh Company, Ltd., Tokyo, Japan; Ricoh Corporation, San Jose, Calif.

[21] Appl. No.: 513,015

[22] Filed: Aug. 9, 1995

[51] Int. Cl.$^6$ .............................. H04N 1/00; H04N 1/32
[52] U.S. Cl. .................................. 358/442; 358/407
[58] Field of Search ........................ 379/100, 375; 358/442, 400, 405, 407, 434, 435, 436, 437, 439

[56] References Cited

U.S. PATENT DOCUMENTS

| | | | |
|---|---|---|---|
| 4,991,200 | 2/1991 | Lin | 379/100 |
| 5,333,190 | 7/1994 | Eyster | 379/375 |
| 5,499,287 | 3/1996 | Campbell | 379/100 |
| 5,546,451 | 8/1996 | Shen | 379/93 |
| 5,563,938 | 10/1996 | Soshea et al. | 379/120 |

Primary Examiner—Thomas D. Lee
Assistant Examiner—Jerome Grant, II
Attorney, Agent, or Firm—Fenwick & West LLP

[57] ABSTRACT

An secured fax adapter apparatus uses a relay circuit to selectively couple a G3 fax to a secured line via a secured telephone unit (STU). The G3 fax can alternatively be coupled to a public switched telephone network (PSTN) via a PSTN port. The secured fax adapter has an enhanced DAA having a controller, a fax communication circuit, a current limited off hook detection circuit, a relay circuit for selectively coupling the external device ports, and a ring generation circuit for producing a square wave for ring generation. In one embodiment, the current-limited off-hook detection circuit uses a symmetrical network of transistors coupled to diodes to limit the current drawn by a load. In another embodiment, the relay circuit has four relays for selectively coupling the G3 fax to the fax communication circuit, the STU to the PSTN, the G3 fax to the PSTN, or the STU to the fax communication circuit. The relay circuit has an additional relay for coupling the off-hook detection circuit to the fax communication circuit.

10 Claims, 12 Drawing Sheets

DOUBLE SWITCHERS: SQUARE WAVE RING GENERATION

1

SECURE FAX ADAPTER METHOD AND APPARATUS

BACKGROUND OF THE INVENTION

1. Field of the Invention

This invention relates to facsimile (fax) devices and more particularly to fax adapter devices and methods of operation.

2. Description of the Related Art

Certain conventional fax machines transmit and receive non-secured data using group 3 (G3) fax protocol over a Public Switched Telephone Network (PSTN). Certain other fax machines transmit and receive secured data over a secured network using a secure protocol such as Secured Telephone Unit (STU) protocol. In recent years, the cost of G3 fax machines has decreased and conventional G3 fax machines have proliferated. These conventional G3 fax machines however, cannot interface directly with an STU. In certain instances, it is desirable to couple a conventional G3 fax to a secured network via an STU. In these instances, secure fax adapters are used for coupling a conventional G3 fax to an STU.

Secure fax adapters conventionally use a Data Access Arrangement (DAA) to perform several Telephone Central Office (TCO) functions including off-hook detection and ring generation. Conventional DAA off-hook detection circuits measure a voltage drop across a load to arrive at an on- or off-hook decision. Conventional off-hook detection circuits do not adequately current limit to protect defective or incompatible devices coupled to the secure fax adapter. Additionally, some conventional off-hook detection circuits have a diode in the sensing signal path which has the undesirable effect of introducing distortion to the sensing signal.

Ring generation is another TCO function typically performed by a secure fax adapter DAA. The DAA of some conventional adapters use a transformer to generate a sinusoid for ring generation. Use of a transformer, however, is undesirable due to the added cost, weight and size.

Thus, there is a need for a low cost, light weight and compact secured fax adapter having an enhanced DAA with improved ring generation and off-hook detection and providing increased flexibility in operating configuration.

SUMMARY OF THE INVENTION

In accordance with the present invention, there is provided an enhanced DAA having improved off-hook detection, ring generation and configuration flexibility. The enhanced DAA has a signal port for coupling to a fax communication circuit, external device ports including a STU port and a G3 fax port, an off-hook detection circuit, a ring detection circuit, a ring generation circuit and a relay circuit.

In one embodiment, the relay circuit is configured to selectively couple the G3 fax port to any of the STU port, the fax communication circuit or the ring generation circuit, responsive to control signals received from a controller. In one embodiment, the controller is a CPU. In another embodiment, the DAA also has a PSTN port for coupling to a PSTN line. In this embodiment, the relay circuit additionally couples the STU port to the fax communication circuit or to the PSTN port responsive to control signals received from the controller.

In another embodiment, the off-hook detection circuit has a current limiting circuit coupled to two sensing nodes and a detection circuit for generating a logic signal corresponding to the signal sensed at the sensing nodes. The output of the detection circuit is a logic signal indicative of either on- or off-hook detection for coupling to the controller. The current limiting circuit has symmetrical current limiters, one for each sensing node. The current limiters each have a transistor having a base electrode coupled to a power supply through a diode to limit the current flowing through the transistor and to the load. The current limiting circuits are coupled to a detection circuit that generates a logic signal indicating on- or off-hook detection. The logic signal is coupled to the controller.

In another embodiment, the ring generator generates a square wave ring signal. The ring generator has a pair of switching circuits. A first switching circuit has a non-inverting conditioning circuit to receive a square wave having a desired frequency from the controller. The non-inverting conditioning circuit output is coupled to a push-pull amplifier for generating an amplified square wave matching the frequency of the square wave received from the controller. A second switching circuit has an inverting conditioning circuit to also receive the square wave from the controller. The inverting conditioning circuit output is coupled to a push-pull amplifier for generating an amplified, inverted square wave matching the frequency of the square wave received from the controller.

DESCRIPTION OF THE PREFERRED EMBODIMENT

Figure 1:
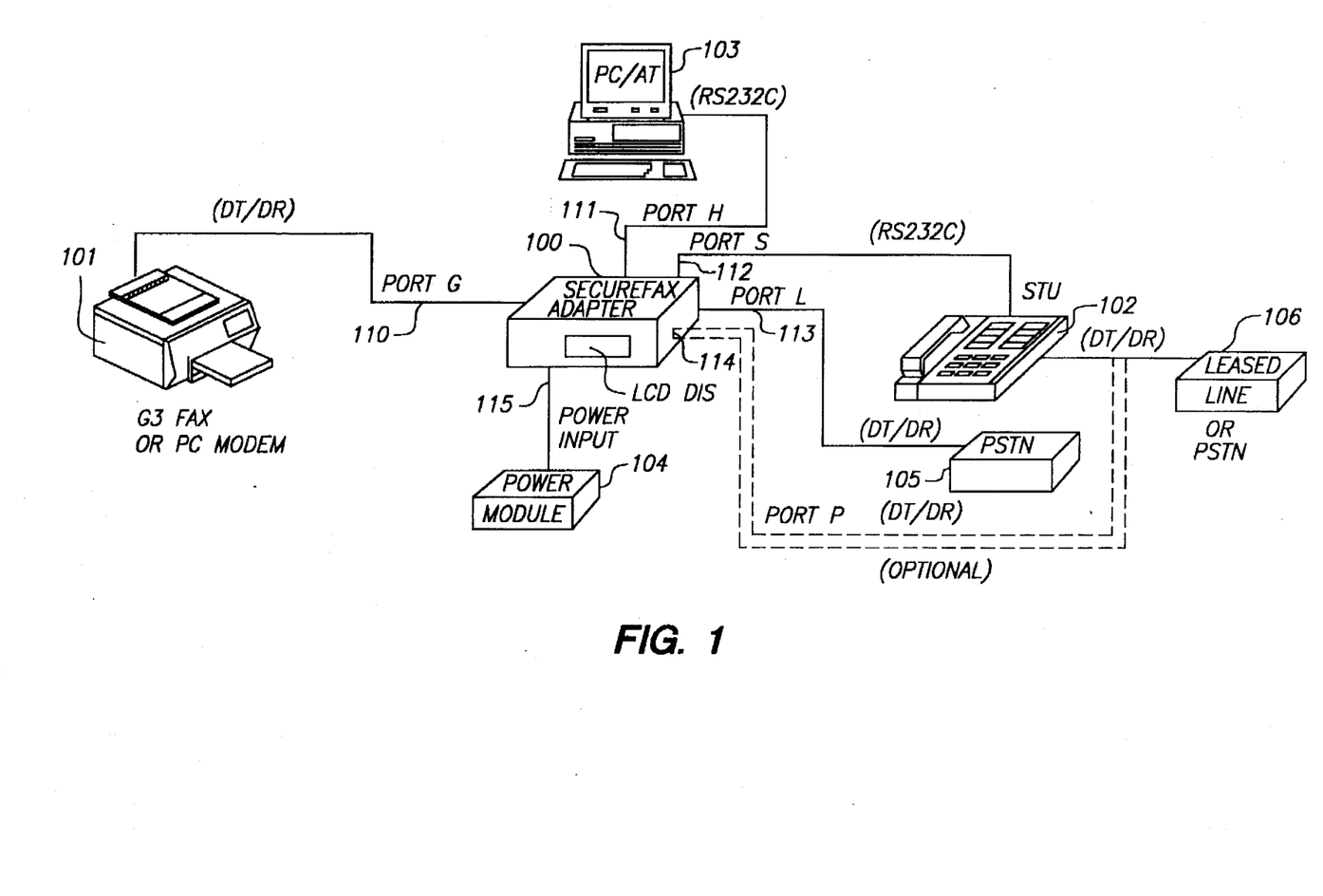
FIG. 1 is a block diagram of a secure fax adapter coupling a G3 fax to an STU in accordance with the present invention.

There is illustrated in FIG. 1, a block diagram of a secure fax adapter (SFXADP) 100 coupling a G3 fax 101 to a STU 102 in accordance with the present invention. SFXADP 100 has various user selectable routing configurations for adapting conventional G3 fax 101 to STU 102. SFXADP 100 has external device ports 110–115 for coupling to conventional external devices including a G3 fax 101, a STU 102, a personal computer 103, a PSTN (a telephone subscriber line) port 105 and a power module 104. Port G 110 couples SFXADP 100 to a conventional G3 fax 101. Alternatively, port G 110 of SFXADP 100 may be coupled to a modem or other device conforming to the CCITT Group 3 protocol of port G 110. In the preferred embodiment, port G 110 is a standard telephone Subscriber Line Interface Circuit (SLIC) consisting of two wires: a Data Tip (DT) and a Data Ring (DR) wire. Port S 112 couples SFXADP 100 to secured communication equipment such as an STU 102 and port H 111 couples SFXADP 100 to a host such as a personal computer. Port P 114 is an auxiliary phone port that can be internally linked to port L 113 to form a common PSTN port. In the preferred embodiment, ports S 112 and H 111 are RS-232C ports. Power module 104 is coupled to the power input port 115 of SFXADP 100. STU 102 is additionally coupled to a leased line 106. Alternatively, conventional STU 102 may be coupled to a PSTN, or coupled back to SFXADP 100 through port P 114. In the preferred embodiment, ports P 114 and port L 113 are RJ11 ports each having DT and DR wires.

Figures 2, 2B:
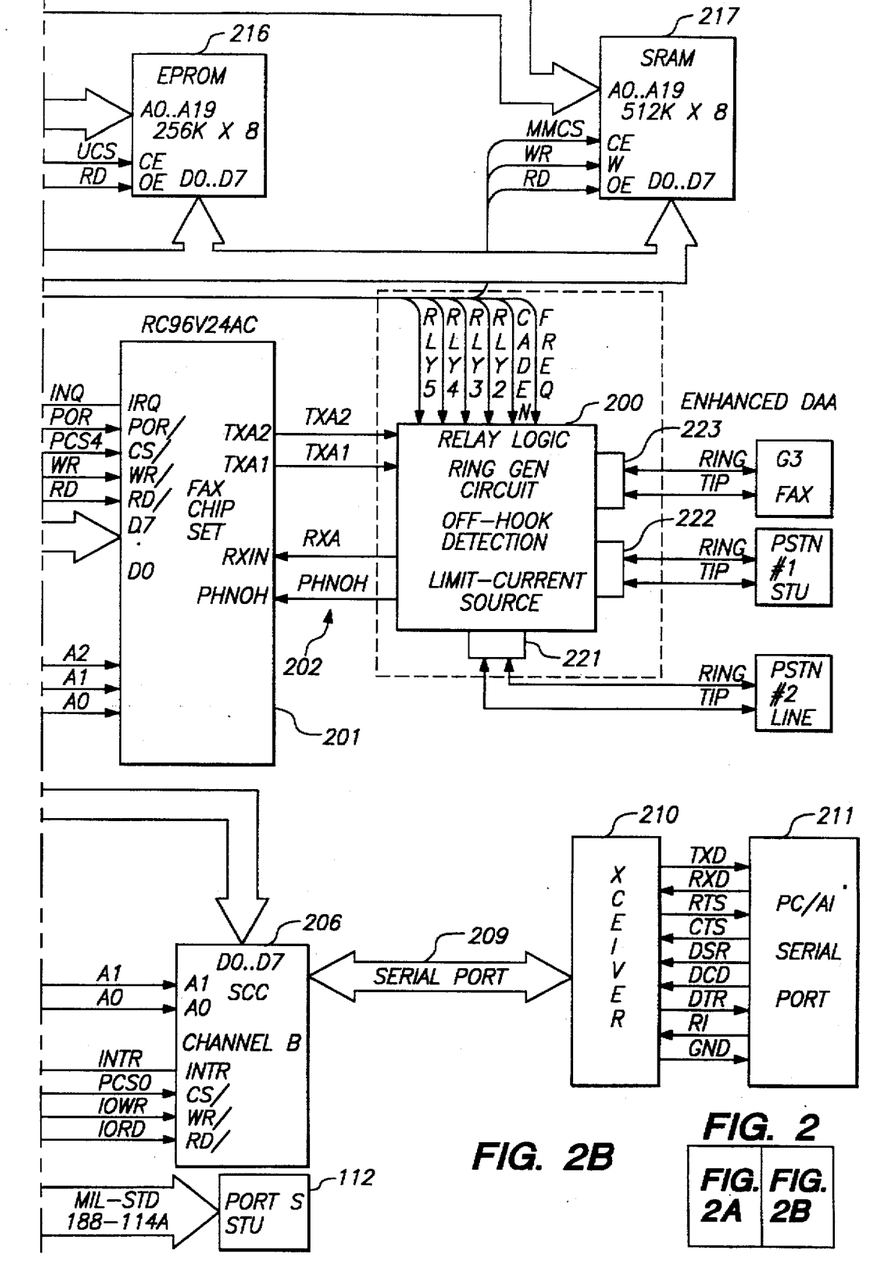
FIG. 2 is a block diagram of a secure fax adapter in accordance with the present invention.
Figure 2A:
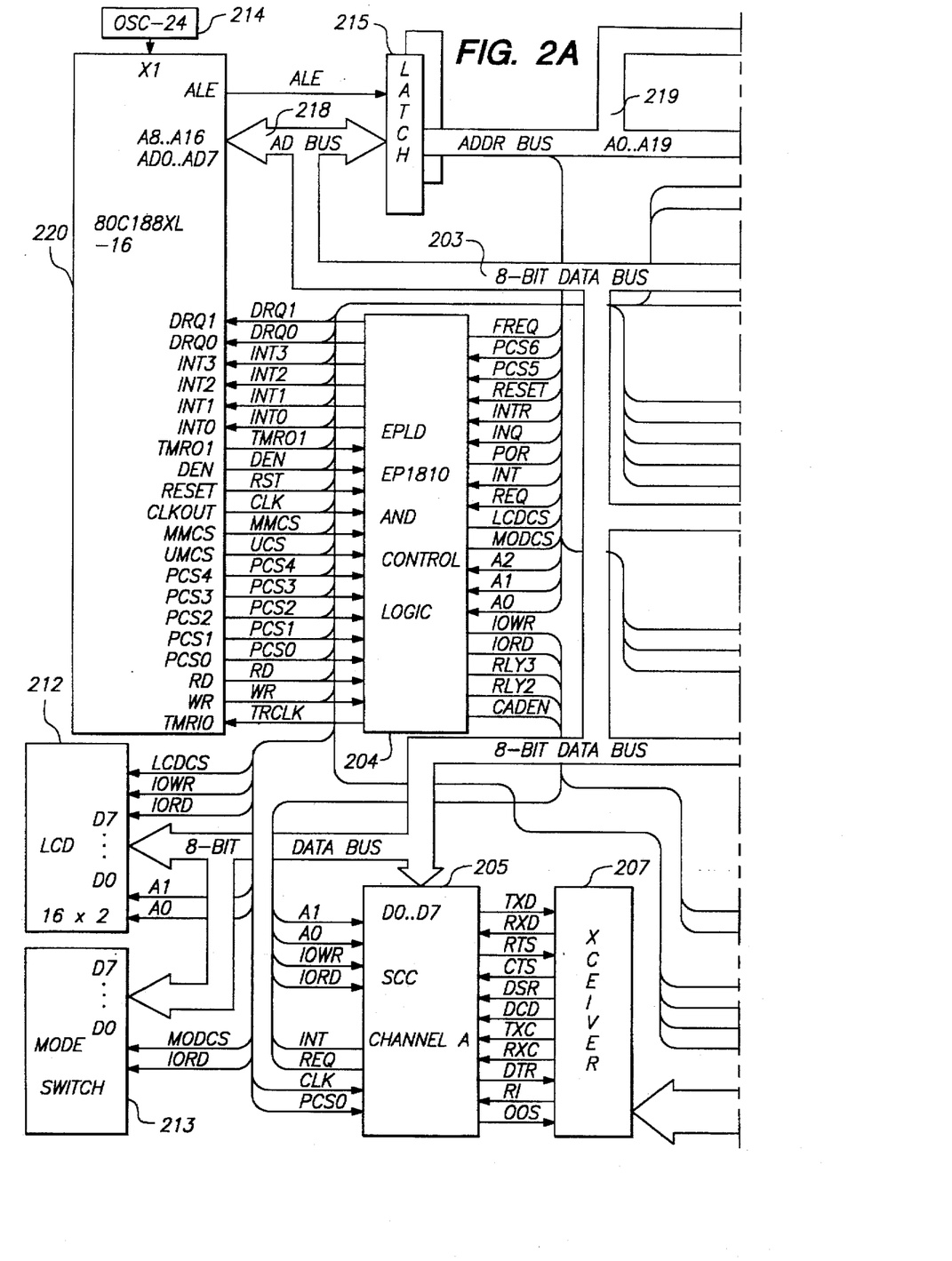

There is illustrated in FIG. 2 a block diagram of SFXADP 100 in accordance with the present invention. SFXADP 100 has a controller such as a central processor unit (CPU) 220 for controlling fax communication by receiving a timing signal from oscillator 204, and sending and receiving control instructions to and from an erasable programmable memory (EPROM) device 216 and static random access memory (SRAM) 217. In a preferred embodiment, CPU 220 is an Intel 80C188XL, A standard erasable programmable logic device (EPLD) 204, such as a model EP1810 integrated circuit is also in communication with CPU (controller) 220 to control serial communication controllers (SCC) 205, 206 and fax chip set (fax communication circuit) 101. Fax chip set 201 is a fax communication circuit which uses conventional fax protocol. In a preferred embodiment, fax chip set 201 is a model RC96V24AC fax chip set produced by Rockwell.

SCCs 205, 206 are serial communication controllers such as a commercially available model AM85C30 manufactured by Advanced Micro Devices of Sunnyvale, Calif. SCCs 205, 206 convert transmitted data from a parallel data format to a serial data format, and convert data received from either a secure fax network or a PSTN from serial data to parallel data. During transmission, fax chip set 201 transfers data to data bus 203. SCC 205 receives the data in parallel form from data bus 203 and transfers data serially to transceiver 207. Transceiver 207 thereafter transmits the serial data to port S 112 for coupling to an STU 102. CPU (controller) 220 and SCC 205 set up automatic synchronous word, baud rate detection, and network information exchange for all standard secure fax protocols which preferably are embedded or stored in EPROM 216. Similarly, SCC 206 receives parallel data from data bus 203 and transfers data serially to transceiver 210. Transceiver 210 thereafter transmits the serial data to port H 110 for coupling to a PC/AT 103. CPU (controller) 220 and SCCs 205, 206 set up automatic synchronous word, baud rate detection, and network information exchange for all standard PC/AT protocols which preferably are embedded or stored in EPROM 216.

CPU (controller) 220 sends and receives address information across internal address bus 218. Internal address bus 218 is connected to data bus 203 for receiving address information and is connected to latch 215 for delivering address information along address bus 219 to either an erasable programmable read only memory (EPROM) 216 as a memory means containing protocol software, or to a static random access memory (SRAM) 217 as a memory means, depending on control instructions received from the CPU (controller) 220. In a preferred embodiment, EPROM 216 stores 256K 8-bit words and SRAM 217 stores 512K 8-bit words. Data bus 203 also couples data to both EPROM 216 and SRAM 217 as CPU (controller) 220 controls memory read/write functions. Address bus 219 further conveys control information from CPU (controller) 220 to EPLD 204, SCC 205, 206 and fax chip set 201. CPU (controller) 220 directly conveys control instructions to EPLD 204, EPROM 216, SRAM 217, DAA 200, fax chip set 201, SCC 205, 206, liquid crystal display (LCD) 212, and mode switch 213.

Figure 3A:
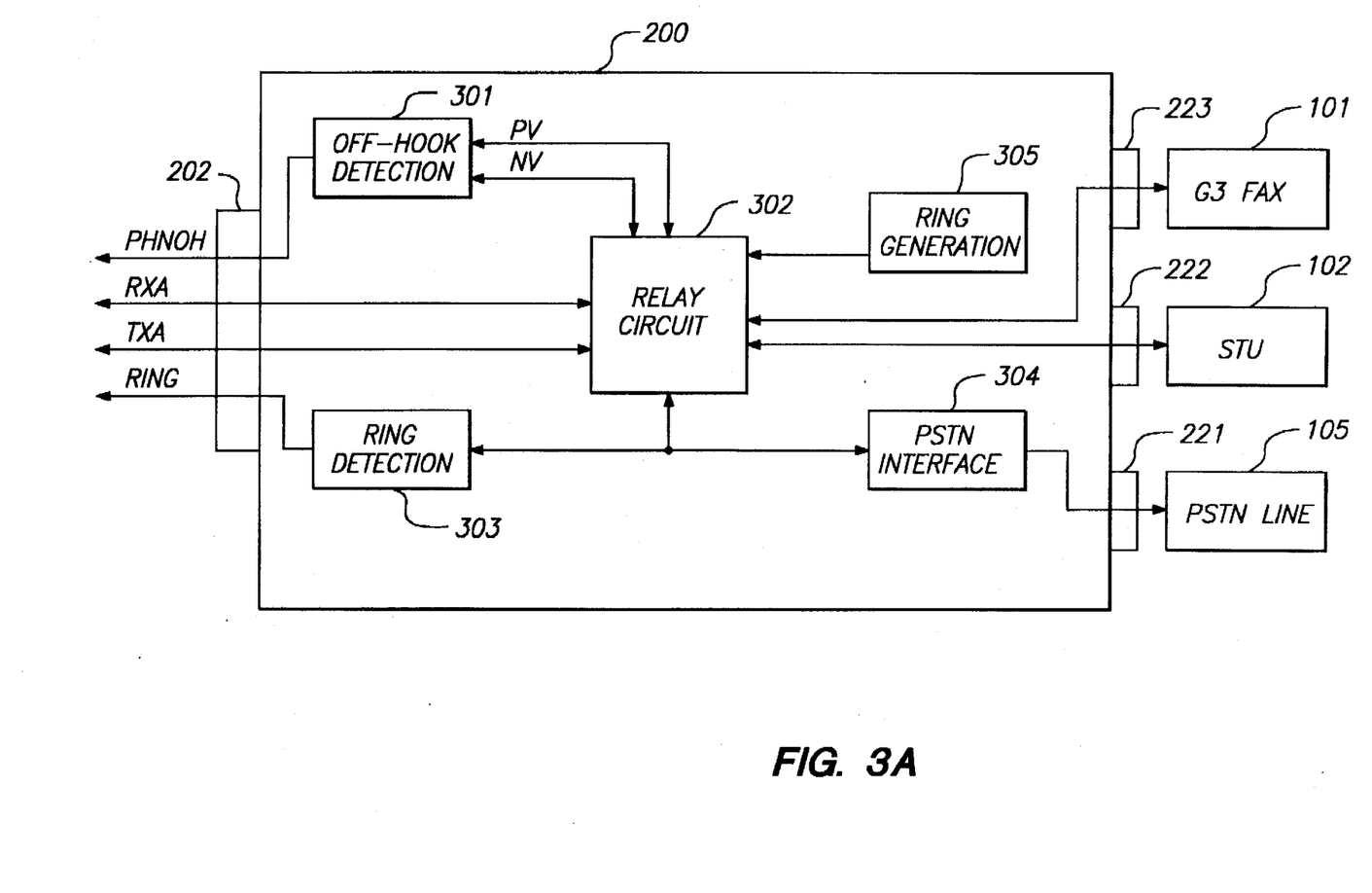
FIG. 3A is a block diagram of an enhanced DAA in accordance with the present invention.

There is illustrated in FIG. 3A a block diagram of an enhanced DAA 200 in accordance with the present invention. DAA 200 has fax chip set interface port 202, external device ports 221, 222, 223, an off-hook detection circuit 301, a relay circuit 302, a ring detection circuit 303, a ring generation circuit 305 and a PSTN line interface 304. Relay circuit 302 is coupled to device ports 222, 223 and to device port 221 via PSTN line interface 304. Relay circuit 302 is additionally coupled to ring generation circuit 303, to off-hook detection circuit 301 and to interface ports 202.

Figures 3B, 3B:
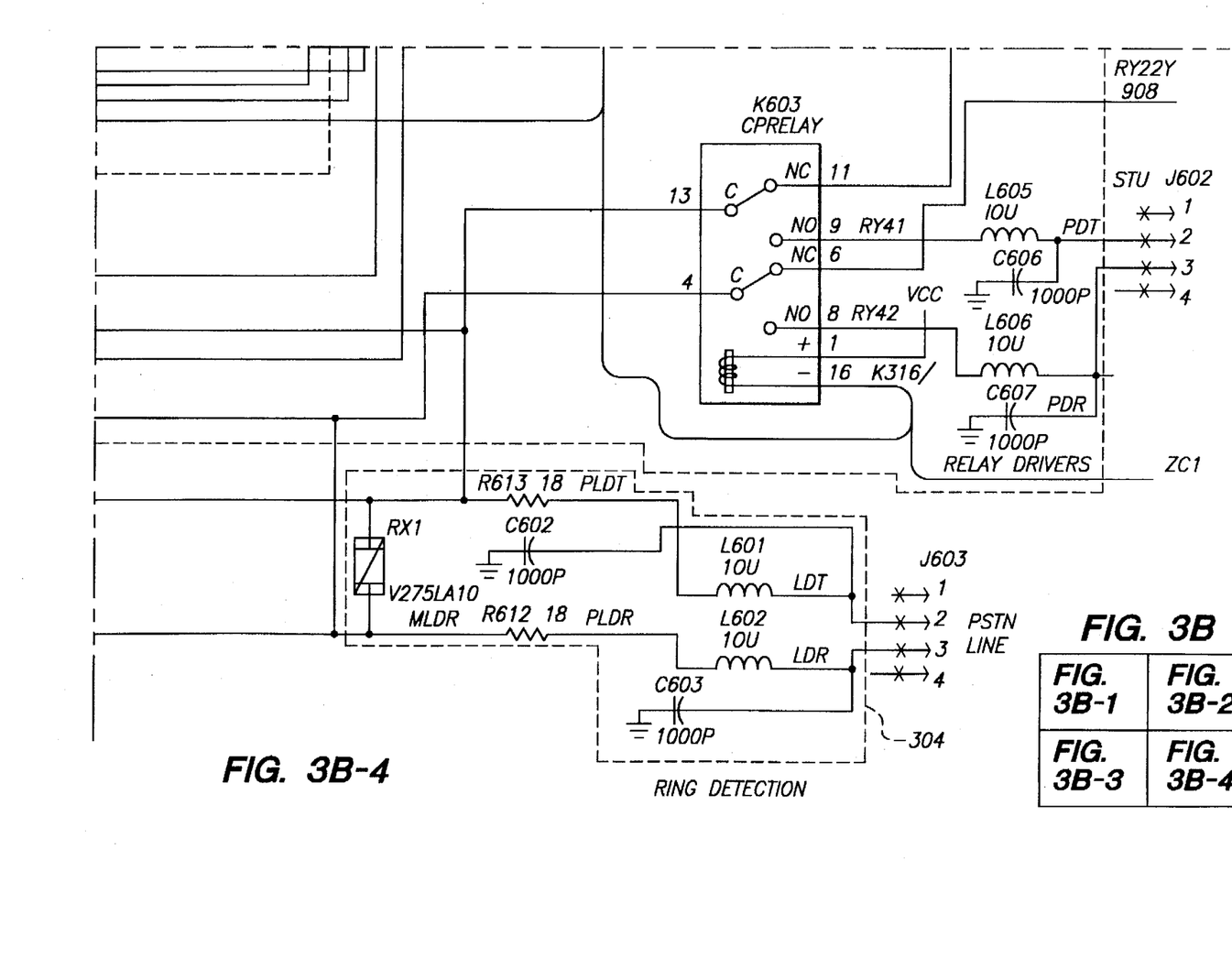
FIG. 3B is a schematic diagram of an enhanced DAA in accordance with the present invention.
Figure 3B:
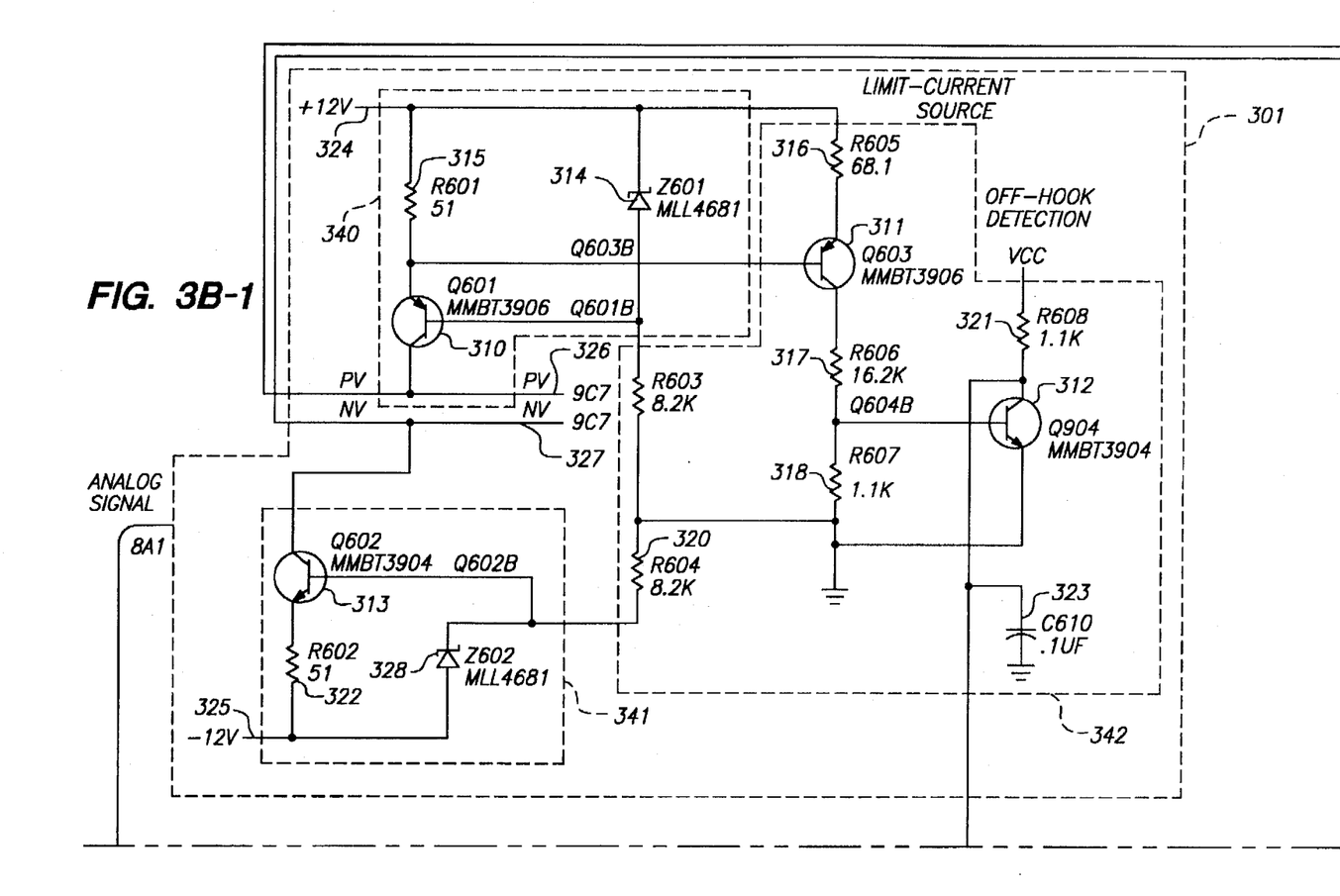
Figure 3B:
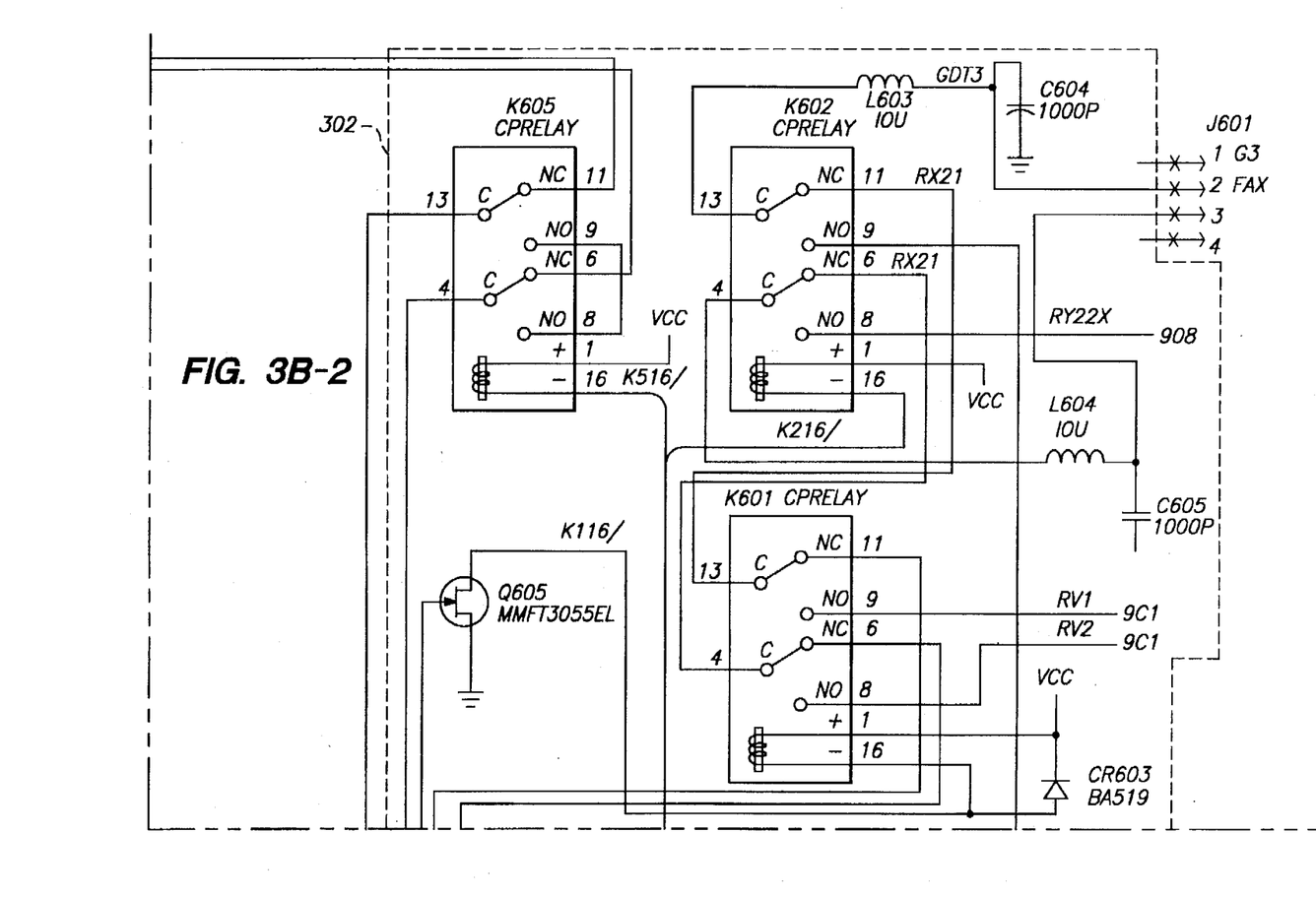
Figure 3B:
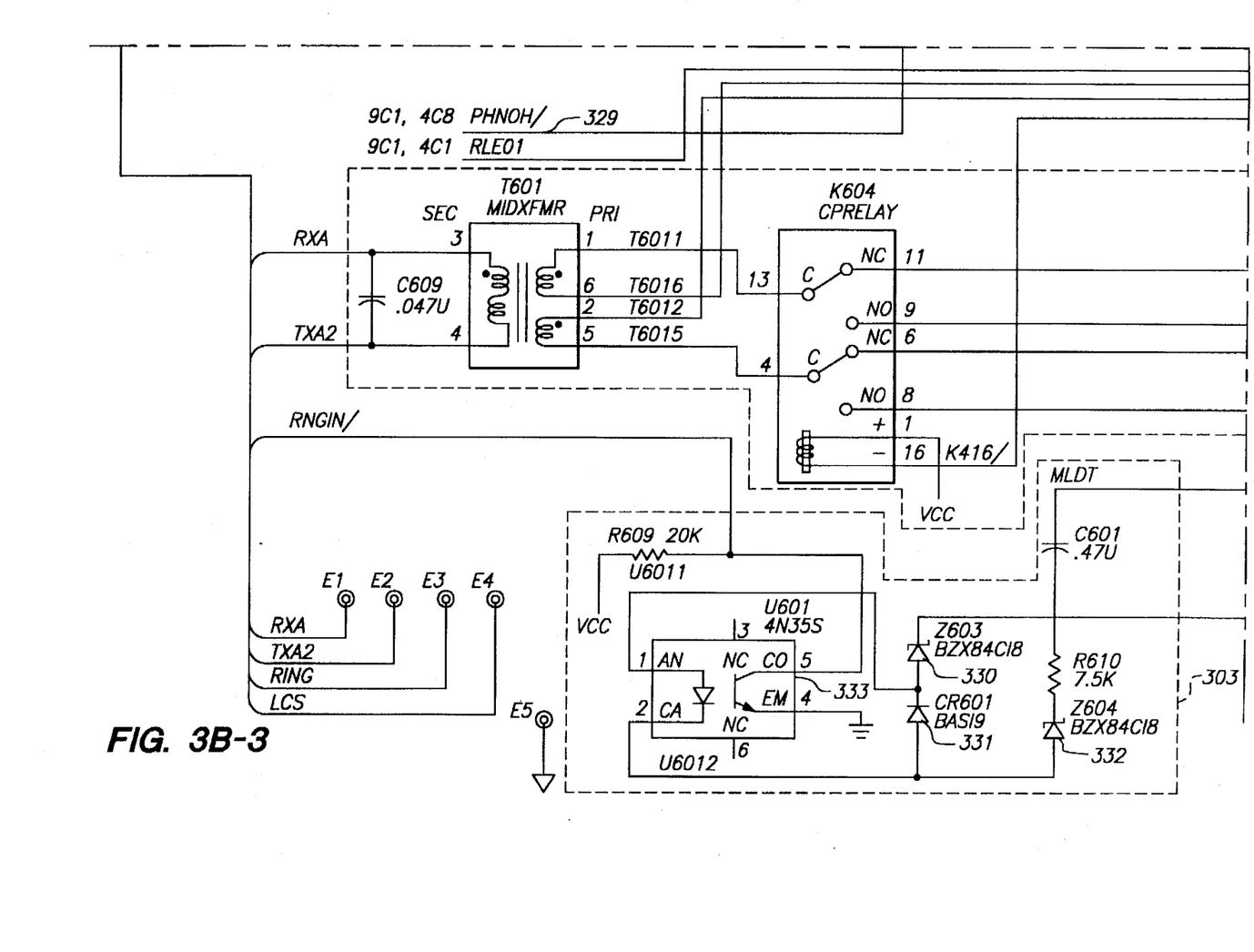

There is illustrated in FIG. 3B a schematic diagram of a portion of enhanced DAA 200 in accordance with the present invention. The schematic diagram of FIG. 3B depicts a schematic diagram of off-hook detection circuit 301, relay circuit 302, ring detection circuit 303 and PSTN line interface 304.

Figures 4, 4A:
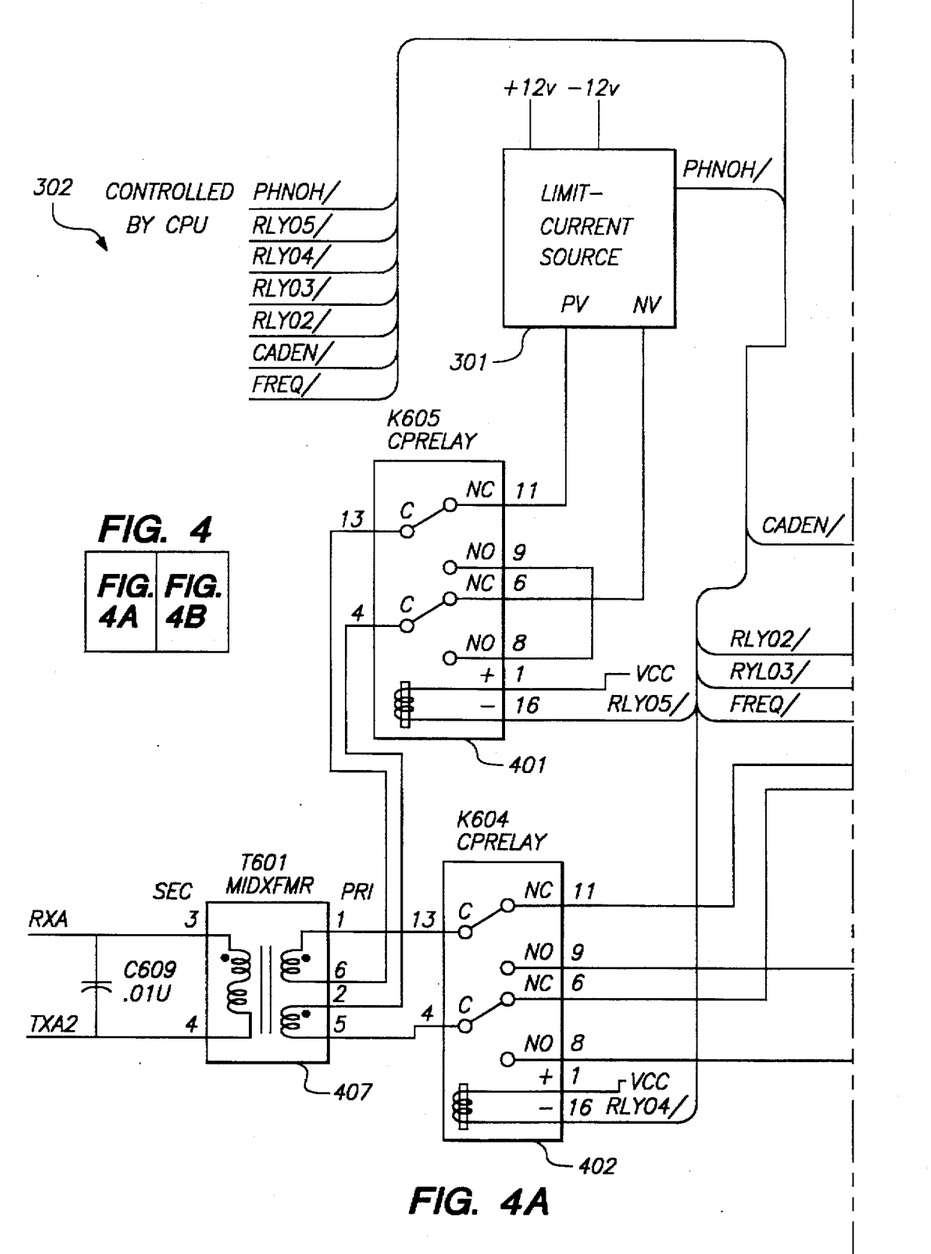
FIG. 4 is a schematic diagram of a relay circuit in accordance with the present invention.
Figure 4B:
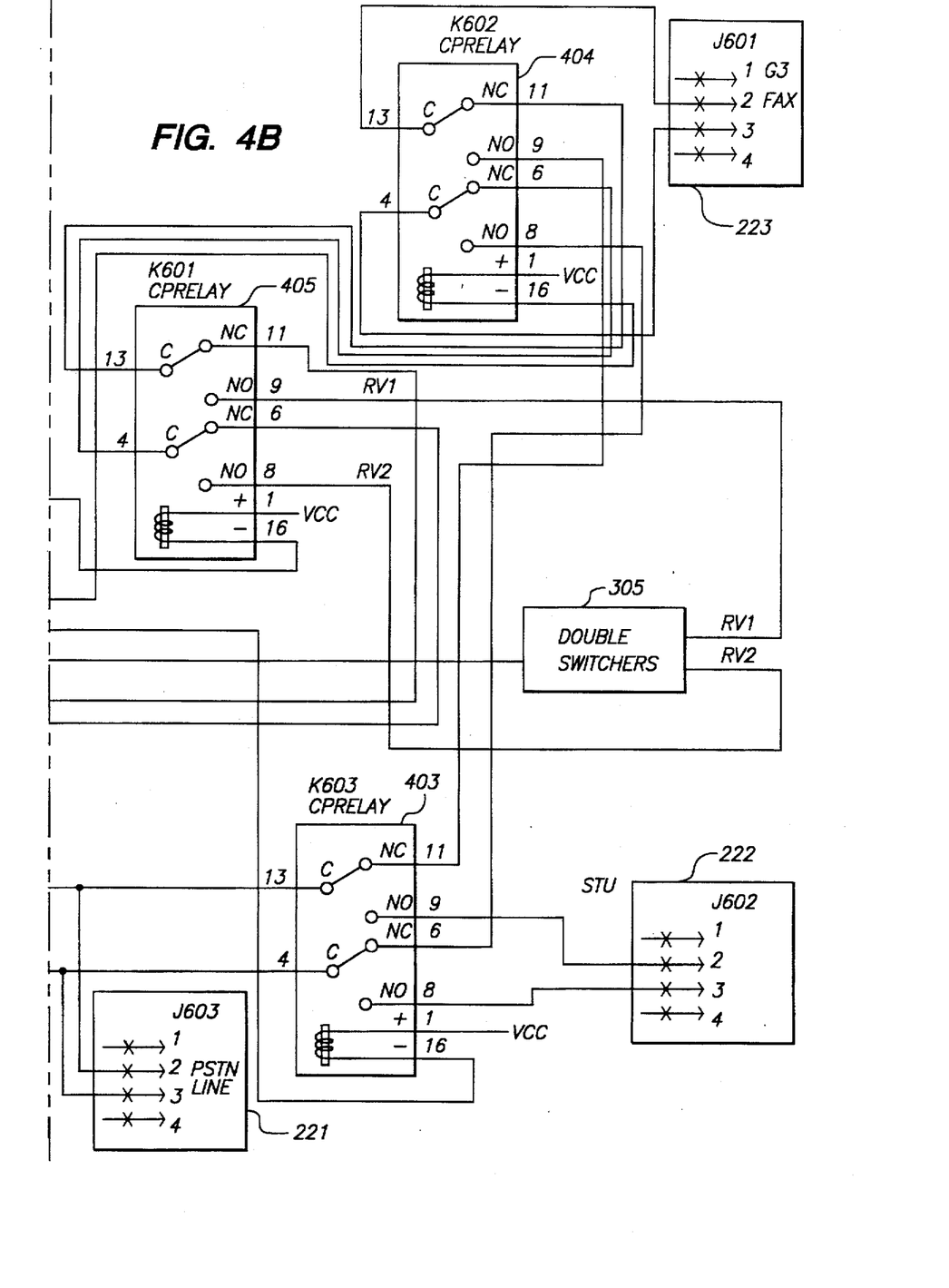

FIG. 4 illustrates a schematic diagram of relay circuit 302 of DAA 200. Relay circuit 302 includes relays 401-405 and split transformer 407. Split transformer 407 has receive (RX) and transmit (TX) nodes for coupling to fax chip set 201 via interface ports 202. Relays 401-405 electrically couple external device ports 221, 222, 223, fax chip set interface port 202, ring generation circuit 305 and off-hook detection circuit 305 in a desired configuration in accordance with Table 1 below.

TABLE 1

| Relay 401 | Relay 402 | Relay 403 | Relay 404 | Relay 405 | Configuration |
| --- | --- | --- | --- | --- | --- |
| OFF | OFF | OFF | OFF | OFF | G3 fax to fax Chip Set |
| OFF | OFF | ON | OFF | OFF | STU to PSTN, single line |
| OFF | OFF | OFF | ON | OFF | G3 fax to PSTN (SFXADP bypass) |
| OFF | OFF | OFF | OFF | ON | Ring signal to G3 fax |
| ON | ON | OFF | OFF | OFF | PC/AT to fax Chip Set |

In operation, relays 401-405 are configured in accordance with a desired electrical coupling. In the default operating mode, all relays are OFF and therefore relay circuit 402 couples the TX and RX nodes to port G 110 which is adapted to couple to a G3 fax machine. Thus, in the default operating mode, the RX and TX signals of fax chip set 201 are coupled to G3 fax 101.

In a second configuration, relay 403 is ON and relays 401, 402, 404, and 405 are OFF thereby coupling port S 112 (which is adapted to couple to STU 102) to port L (which is adapted to couple to PSTN line 105). This configuration is selected when there is only a single PSTN line available in order to transmit and receive data from the single PSTN.

In a third configuration, relay 404 is ON and relays 401-403 and 405 are OFF. In this configuration, Port G 110 (adapted to couple to G3 fax 101) is coupled to Port L 113 (adapted to couple to PSTN line 105). In operation, this third configuration is selected when bypass of SFXADP 100 is desired.

In a fourth configuration, relay 405 is ON and relays 401-404 are OFF. This fourth configuration is selected when SFXADP 100 is in "wake-up" mode. Relay 405 is switched "ON" to isolate G3 fax 101 from RX and TX lines and to instead couple ring generation circuit 406 to G3 fax 101 via port G 110.

In a fifth configuration, relays 403-405 are OFF and relays 401 and 402 are ON. This fifth configuration couples port H 111 (which is adapted to couple to personal computer 103) to fax chip set 201.

Referring again to FIG. 3B, off-hook detection circuit 301 has sensing nodes 326, 327, symmetrical current limiting circuits 340, 341 and detection circuit 342. Sensing nodes PV 326 and NV 327 are coupled to a load such as G3 fax 101 via port G 110. Current limiting circuit 340 includes transistor 310, resistor 315 and zener diode 314. Current limiting circuit 341 includes transistor 313, resistor 322 and zener diode 328. Transistors 310, 313 are current limiting regulators for supplying positive and negative current respectively. Zener diodes 314, 328 are coupled to each current supplying transistor 310, 314 to limit the current supplied to 16 mA. By limiting the current supplied by off-hook detection circuit 301, external equipment and devices are safeguarded against damage. Off-hook detection circuit 301, limits current by creating a high impedance between input voltage nodes 324, 325 (+/–12 volts) and any load that is coupled to sensing nodes 326, 327.

Off-hook detection circuit 301 also includes a detection circuit 342 having resistors 316–318, 320–321, transistors 311–312 and capacitor 323. Detection circuit 342 generates a logic signal PHNOH/329 indicating either an "off-hook" or an "on-hook" detection at sensing nodes 326, 327.

When G3 fax 101 is "off hook" sensing nodes PV 326 and NV 327 have a 600 Ω load and thus are pulled "low" and transistors 310 and 313 are in the "on" state. The current flowing (sourced) to the load however, is limited using zener diodes 314, 328. Zener diodes 314, 328 can sustain a maximum voltage drop of 2.4 volts and thus limits the current flowing through transistors 310, 313 to sensing nodes PV 326 and NV 327. The maximum voltage drop across resistors 315, 322 equal the maximum drop sustainable by the zener diodes 314, 328 respectively less the base-emitter drop across transistors 310, 313. The emitter currents $I_e$ of transistors 310, 313 corresponds to the current drawn by the G3 fax 101 load. Thus, the load current equals the current flowing through resistors 315, 322 respectively and is limited by zener diodes 314, 328. When transistors 310, 313 are in the "on" state, transistors 311 and 312 are also "on" causing the PHNOH/line to be "low" indicating that the load is "off hook."

When G3 fax 101 is "on hook" sensing nodes PV 326 and NV 327 have a high load impedance and thus nodes PV 326 and NV 327 remain "high." With sensing nodes PV 326 and NV 327 high, transistors 310, 313 are in the "off" state with negligible collector current $I_c$. Because the collector voltage of transistor 310 is essentially the same as the base voltage of transistor 311, and because resistor 316 has a greater resistance than resistor 315, the emitter voltage of transistor 311 is less than the base voltage and thus transistor 311 is in the "off" state with negligible current flow. Transistor 313 is similarly biased in the "off" state. Because negligible current flows through resistor 317, 320, transistor 312 is biased in the "off" state causing logic signal PHNOH/329 to be "high" indicating that the load is "on hook."

In addition to off-hook detection circuit 301, DAA 200 also has ring detection circuit 303. Ring detection circuit 303 is coupled relays 402 and 403 and detects a ring signal received from either port S 112 (the STU port) or from port L 113 (the PSTN line). Ring detection circuit 303 has decreased power requirements as compared to conventional ring detection circuits. The power consumption of ring detection circuit 303 is reduced using 18 volt zener diodes 330 and 332 and switching diode 331. A ring signal greater than 18 volts DC triggers the threshold of optoisolator 333, and optoisolator 333 couples a signal of the same frequency to fax chip set 201. Using zener diodes 330 and 332 and switching diode 331 to condition the ring signal and optoisolator 333 to coupled the ring signal to fax chip set 201, the need for a high voltage ring signal is eliminated.

Figure 5A:
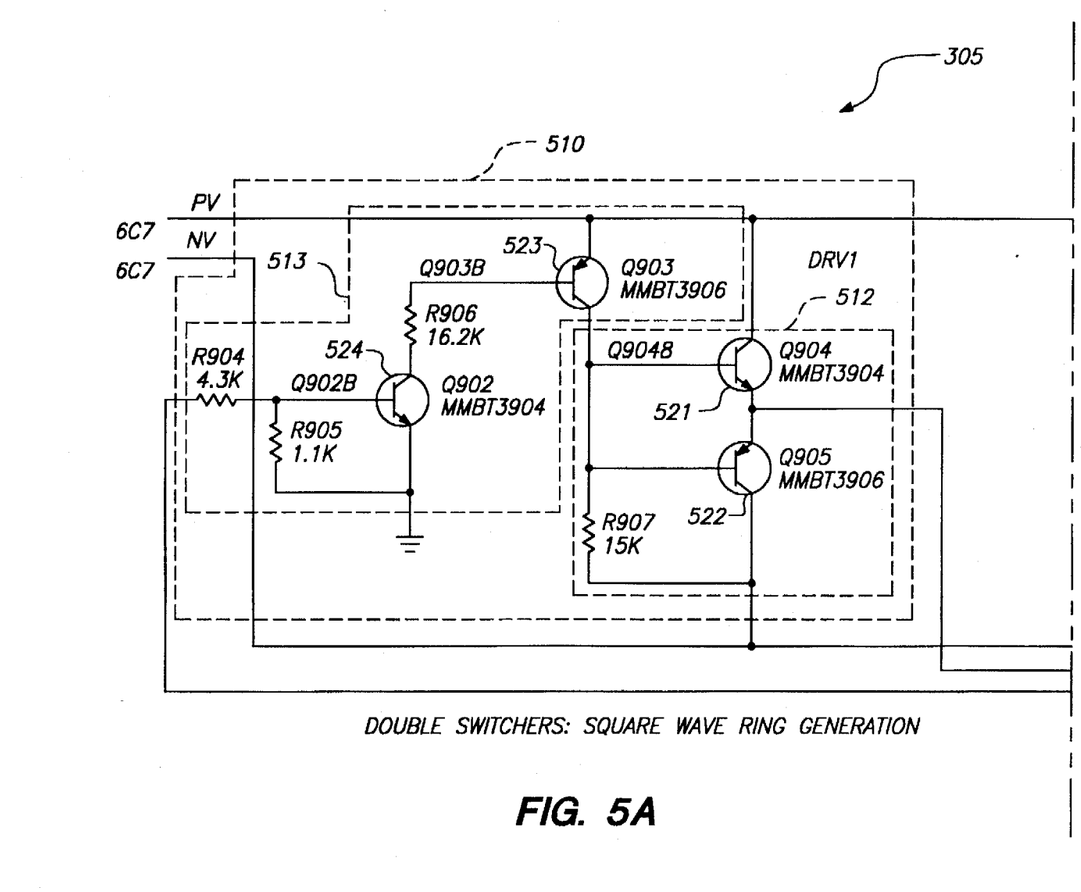
FIG. 5 is a schematic diagram of a ring generation circuit in accordance with the present invention.
Figure 5B:
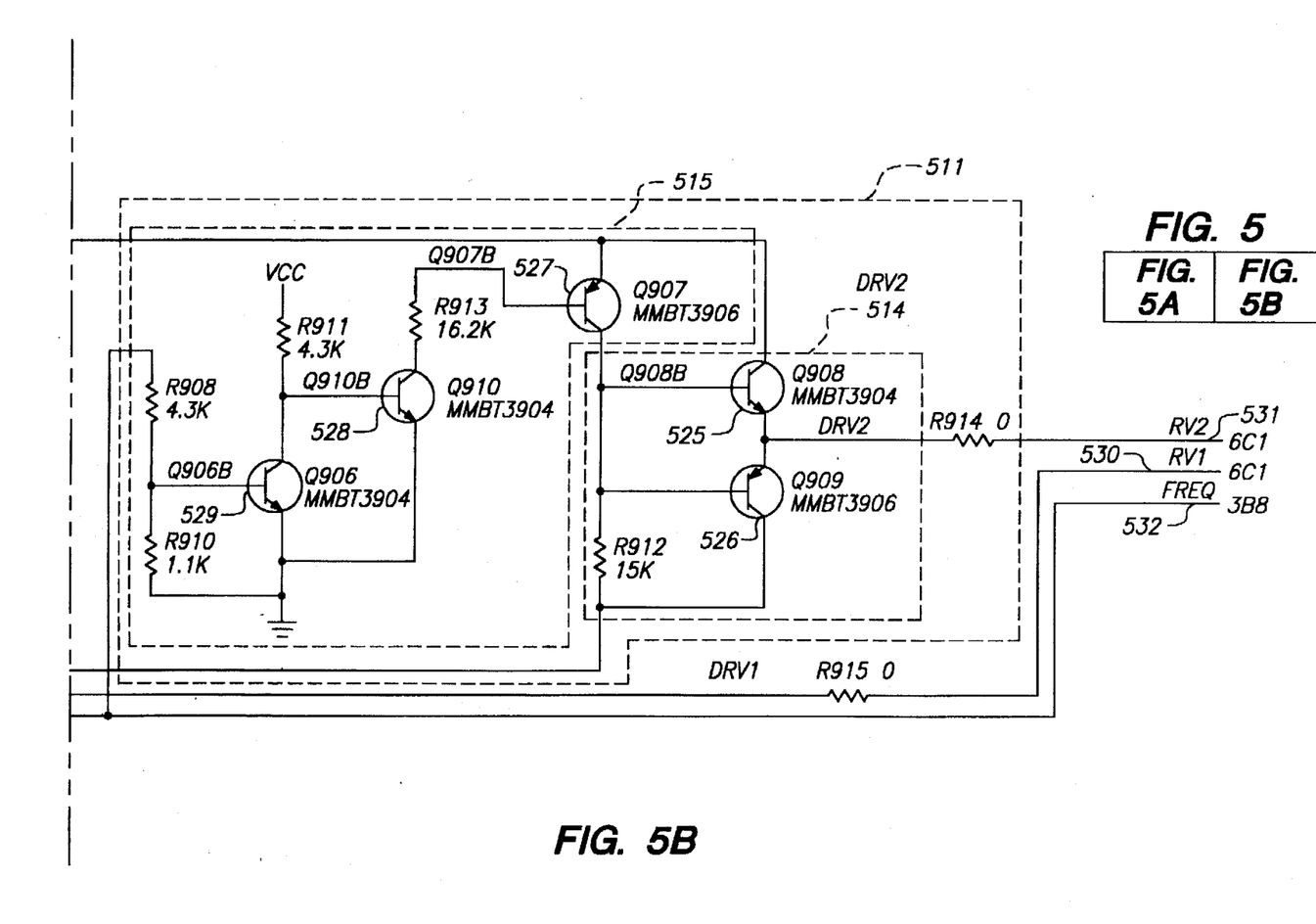

Referring now to FIG. 5 there is illustrated a ring generation circuit 305 in accordance with the present invention.

Ring generation circuit 305 generates a pair of square wave ring signals 530, 531 to induce a connection with G3 fax 101. Because ring detection circuit 303 does not require a traditional high voltage ring signal, ring generation circuit 305 does not have a bulky and heavy step-up transformer. Instead, ring generation circuit 305 uses transistor double switching circuits 510, 511 to generate the pair of square wave ring signals 530, 531 having a voltage swing between +12V and –12V. Ring generation circuit 305 generates an absolute voltage of 24V, sufficient to trip the ring detection circuit 303. Additionally, the frequency of the pair of ring signals 530, 531 is controllable by microprocessor 220 for adapting to the various G3 fax requirements of foreign countries.

Ring generation circuit 305 receives input signal FREQ 532 and generates the pair of ring signals 530, 531 to drive ring detection circuit 303. In a preferred embodiment, input signal FREQ 532 is a 5 volt square wave at 20 Hz frequency (in conformance with the telephone standard in North America) and the pair of ring signals 530, 531 are square waves having an absolute voltage of 24 volts. Ring generation circuit 305 includes two complementary switching circuits 510, 511. Switching circuit 510 includes a drive circuit 512 and a non-inverting circuit 513. Drive circuit 512 is a push-pull follower amplifier and includes NPN transistor 521 serially coupled to PNP transistor 522. The base electrodes of transistors 521, 522 are coupled together and to the emitter electrode of transistor 523. Similarly, drive circuit 514 is push-pull follower amplifier and includes NPN transistor 525 serially coupled to PNP transistor 526. The base electrodes of transistors 525, 526 are coupled together and to the emitter electrode of transistor 527. Drive circuits 512, 514 are coupled to +12V and –12V voltage supplies. Drive circuits 512, 514 generate the pair of ring signals 530, 531 having square waves with opposite voltage swings.

In operation, non-inverting circuit 513 conditions the received frequency signal FREQ 532 using transistors 524, 523. The output of non-inverting circuit 513 is coupled to drive circuit 512. When FREQ 532 is a "1" or "high" (when the signal has a voltage above the threshold required to turn transistor 524 on), transistor 524 conducts and turns on transistor 523 so that transistor 523 is also conducting. Conversely, when FREQ 532 is "0" or low, transistors 524 and 523 are off and not conducting. Transistor 523 drives transistor pair 521 and 522 to generate an output which follows FREQ 532.

Switching circuit 511 inverts and amplifies the received input (FREQ 532). Inverting circuit 515 couples FREQ 532 to drive circuit 514 using transistors 527, 528 and 529 to invert FREQ 532. In operation, if FREQ 532 is low, the output of inverting circuit 515 is high and thus the output of drive circuit 512 will also be high. If, however, FREQ 532 is high, the output of inverting circuit 515 is low and thus the output of drive circuit 512 will also be low.

In operation, when a user transmits using G3 fax 101, G3 fax 101 switches from the "on-hook" state to the "off-hook" state. Responsive to this change of state, off-hook detection circuit 301 senses that G3 fax 100 is "off-hook" and indicates the off-hook state to the fax chip set 201 using logic signal PHNOH/329. Responsive to fax chip set 201 receiving an "off-hook" indication on logic signal PHNOH/329, controller 220 configures DAA 200 and sends a command to fax chip set 201 for data reception and re-transmission.

If, however, G3 fax 101 is in the "on-hook" state and SFXADP 100 receives an external transmission, SFXADP 100 must "wake-up" G3 fax 101 to place G3 fax 101 in a state to receive incoming data transmission. SFXADP generates a ring signal to wake up G3 fax 101. Upon receiving the ring generation "wake-up" signal, G3 fax 101 changes from the "on-hook" state to the "off-hook" state. When off-hook detection circuit 301 senses that G3 fax 101 is "off-hook" logic signal PHNOH/329 indicates detection of the off-hook state to fax communication circuit 201. Responsive to fax chip set 201 receiving an "off-hook" indication on logic signal PHNOH/329, controller 220 configures DAA 200 to reformat the received external transmission and couple the reformatted data to G3 fax 101.

What is claimed is:

1. A Data Access Arrangement (DAA) apparatus for a fax adapter having a fax communication circuit, a controller and a plurality of external device ports including a fax port and a telephone port, the DAA apparatus comprising:

an off-hook detection circuit having an input coupled to the fax communication circuit and having an output coupled to the controller;

a ring detection circuit having an input and having an output coupled to the fax communication circuit;

a ring generation circuit having an input coupled to the controller and an output; and a relay circuit having a plurality of control inputs coupled to the controller, the relay circuit further comprising:

a first relay having a first port coupled to the fax communication circuit and a second port coupled to the off-hook detection circuit for selectively coupling the fax communication circuit to the off-hook detection circuit responsive to at least one of the plurality of control inputs;

a second relay having a first port, a second port and a third port coupled to the ring generation circuit, the second relay for selectively coupling the first port to the second port and to the ring generation circuit responsive to at least one of the plurality of control inputs;

a third relay having a first port coupled to the fax port, a second port coupled to a first port on the second relay, and a third port, the third relay for selectively coupling the ring generation circuit to the fax port responsive to at least one of the plurality of control inputs;

a fourth relay having a first port, a second port coupled to the third port on the third relay and a third port coupled to the telephone port; and a fifth relay having a first port coupled to the fax communication circuit, a second port coupled to the second port on the second relay and a third port coupled to the first port on the fourth relay for selectively coupling the fax communication circuit to the telephone port.

2. The apparatus of claim 1 wherein the external device ports further comprise a PSTN line port coupled to the third port of the fifth relay.

3. The apparatus of claim 1 wherein the ring generation circuit comprises a square wave generation circuit.

4. The apparatus of claim 3 wherein the square wave generation circuit comprises:

an input node coupled to the controller for receiving a square wave;

a first switching circuit coupled to the input node, the first switching circuit having a non-inverting signal conditioning circuit for conditioning the received square wave and having an amplifier coupled to the non-inverting signal conditioning circuit to generate an amplified conditioned square wave; and a second switching circuit coupled to the input node, the second switching circuit having an inverting signal conditioning circuit for inverting and conditioning the received square wave and having an amplifier coupled to the inverting signal conditioning circuit to generate an amplified inverted square wave.

5. The apparatus of claim 1 wherein the off-hook detection circuit is current limited.

6. The apparatus of claim 5 wherein the current limited off-hook detection circuit comprises:

a first and second sensing node;

a first current limiting transistor having collector, emitter and base electrodes, the collector coupled to the first sensing node, the emitter coupled to a first voltage terminal by a first resistor and the base coupled to the first voltage terminal by a first diode;

a second current limiting transistor having collector, emitter and base electrodes, the collector coupled to the second sensing node, the emitter coupled to a second voltage terminal by a second resistor and the base coupled to the second voltage terminal by a second diode; and a detection circuit having a first input coupled to the first transistor emitter and an output having a first logic state indicating an off-hook condition at the sensing node and a second logic state indicating an on-hook condition at the sensing node.

7. A method of coupling transmission data to a fax having an off-hook state and an on-hook state, comprising:

generating a square wave fax wake-up signal;

coupling the square wave fax wake-up signal to the fax;

after coupling the square wave wake-up signal to the fax, monitoring the fax to detect the off-hook state;

receiving a frequency input signal; and controlling the frequency of the square wave fax wake-up signal responsive to the frequency input signal.

8. A Data Access Arrangement (DAA) apparatus for a fax adapter having a fax communication circuit, a controller and a plurality of external device ports, the DAA apparatus comprising:

a relay circuit having a plurality of inputs and a plurality of outputs and a control input, the relay circuit being adapted to selectively couple the plurality of inputs to the plurality of outputs responsive to the control input;

an off-hook detection circuit coupled to the fax communication circuit and to the relay circuit, the off-hook detection circuit comprising:

a first and second sensing node;

a first current limiting transistor having collector, emitter and base electrodes, the collector coupled to the first sensing node, the emitter coupled to a first voltage terminal by a first resistor and the base coupled to the first voltage terminal by a first diode;

a second current limiting transistor having collector, emitter and base electrodes, the collector coupled to the second sensing node, the emitter coupled to a second voltage terminal by a second resistor and the base coupled to the second voltage terminal by a second diode; and a detection circuit having a first input coupled to the first transistor emitter and an output having a first logic state indicating an off-hook condition at the sensing node and a second logic state indicating an on-hook condition at the sensing node; and a ring detection circuit coupled to the fax communication circuit; and a ring generation circuit coupled to the relay circuit.

9. The apparatus of claim 8 wherein the ring generation circuit is a square wave generator adapted to generate a square wave ring signal.

10. A Data Access Arrangement (DAA) apparatus for a fax adapter having a fax communication circuit, a controller and a plurality of external device ports, the DAA apparatus comprising:

a relay circuit having a plurality of inputs and a plurality of outputs and a control input, the relay circuit being adapted to selectively couple the plurality of inputs to the plurality of outputs responsive to the control input;

an off-hook detection circuit coupled to the fax communication circuit and to the relay circuit;

a ring detection circuit coupled to the fax communication circuit; and a ring generation circuit adapted to generate a square wave ring signal, coupled to the relay circuit, the ring generation circuit including:

an input node coupled to the controller for receiving a square wave;

a first switching circuit coupled to the input node, the first switching circuit having a non-inverting signal conditioning circuit for conditioning a square wave received from the controller and having an amplifier coupled to the non-inverting signal conditioning circuit to generate an amplified conditioned square wave; and a second switching circuit coupled to the input node, the second switching circuit having an inverting signal conditioning circuit for inverting and conditioning the received square wave and having an amplifier coupled to the inverting signal conditioning circuit to generate an amplified inverted square wave.

* * * * *